United States Patent
Masumoto et al.

(10) Patent No.: US 10,658,633 B2
(45) Date of Patent: May 19, 2020

(54) BATTERY AND MANUFACTURING METHOD OF THE BATTERY

(75) Inventors: Kenjin Masumoto, Hyogo (JP); Akira Kakinuma, Osaka (JP); Keisuke Yoneda, Osaka (JP); Junya Nishimori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1091 days.

(21) Appl. No.: 13/984,779

(22) PCT Filed: Dec. 20, 2011

(86) PCT No.: PCT/JP2011/007119
§ 371 (c)(1),
(2), (4) Date: Aug. 9, 2013

(87) PCT Pub. No.: WO2012/111061
PCT Pub. Date: Aug. 23, 2012

(65) Prior Publication Data
US 2013/0316209 A1 Nov. 28, 2013

(30) Foreign Application Priority Data
Feb. 16, 2011 (JP) .................................. 2011-030708

(51) Int. Cl.
*H01M 2/08* (2006.01)
*H01M 2/02* (2006.01)
(Continued)

(52) U.S. Cl.
CPC ............ *H01M 2/08* (2013.01); *H01M 2/022* (2013.01); *H01M 2/0217* (2013.01);
(Continued)

(58) Field of Classification Search
None
See application file for complete search history.

(56) References Cited

U.S. PATENT DOCUMENTS

| | | | | |
|---|---|---|---|---|
| 6,019,802 A | * | 2/2000 | Ishizuka | H01M 4/139 29/623.5 |
| 6,465,134 B1 | * | 10/2002 | Shibuya | H01M 2/16 429/300 |

(Continued)

FOREIGN PATENT DOCUMENTS

| | | |
|---|---|---|
| CN | 101188311 A | 5/2008 |
| CN | 201266646 Y | 7/2009 |

(Continued)

OTHER PUBLICATIONS

International Search Report issued in International Patent Application No. PCT/JP2011/007119 dated Mar. 19, 2012.

(Continued)

*Primary Examiner* — Barbara L Gilliam
*Assistant Examiner* — Angela J Martin
(74) *Attorney, Agent, or Firm* — McDermott Will & Emery LLP

(57) ABSTRACT

A battery includes a first electrode plate, a second electrode plate, a separator interposed between the first and second electrode plates, a closed-end cylindrical metal case accommodating these three elements, and a sealing member sealing an opening of the metal case with an insulating member interposed therebetween. The first and second electrode plates are wound with the separator interposed therebetween to form a wound electrode group. A center axis portion of the wound electrode group is substantially the same as a center axis of a cylinder of the metal case, and contains no power-generating element. A first current collector lead coupled to the first electrode plate extends toward the opening of the metal case, and joined to an inner sidewall surface of the metal case. A second current collector lead coupled to the second electrode plate extends toward the opening of the metal case, and joined to the sealing member.

14 Claims, 3 Drawing Sheets

(51) Int. Cl.
  *H01M 4/66* (2006.01)
  *H01M 4/74* (2006.01)
  *H01M 10/04* (2006.01)

(52) U.S. Cl.
  CPC ........... *H01M 4/661* (2013.01); *H01M 4/742* (2013.01); *H01M 10/0422* (2013.01); *H01M 10/0431* (2013.01); *Y10T 29/4911* (2015.01)

(56) References Cited

U.S. PATENT DOCUMENTS

| | | | | |
|---|---|---|---|---|
| 6,589,694 | B1* | 7/2003 | Gosho | C01G 45/1228 |
| | | | | 429/212 |
| 7,261,792 | B2* | 8/2007 | Higuchi | H01L 24/97 |
| | | | | 156/250 |
| 7,642,015 | B2* | 1/2010 | Inada | H01M 2/266 |
| | | | | 429/231.8 |
| 7,935,445 | B2* | 5/2011 | Kaito | H01M 2/08 |
| | | | | 429/122 |
| 9,577,231 | B2* | 2/2017 | Fuhr | H01M 2/0262 |
| 9,655,393 | B2* | 5/2017 | Mathews | A41D 19/01529 |
| 2006/0240319 | A1 | 10/2006 | Chun | |
| 2007/0269711 | A1* | 11/2007 | Meguro | H01M 2/00 |
| | | | | 429/94 |
| 2008/0241646 | A1* | 10/2008 | Sawa | H01M 4/622 |
| | | | | 429/94 |
| 2009/0136835 | A1* | 5/2009 | Nakai | H01M 2/263 |
| | | | | 429/129 |
| 2010/0124694 | A1* | 5/2010 | Hikata | B26F 1/384 |
| | | | | 429/94 |
| 2010/0129719 | A1* | 5/2010 | Ito | H01M 4/0404 |
| | | | | 429/232 |
| 2010/0310910 | A1* | 12/2010 | Huang | H01M 4/134 |
| | | | | 429/94 |

FOREIGN PATENT DOCUMENTS

| | | | | |
|---|---|---|---|---|
| JP | 2000-003722 A | | 1/2000 | |
| JP | 2000-260473 A | | 9/2000 | |
| JP | 2000-306565 A | | 11/2000 | |
| JP | 2005-129433 A | * | 5/2005 | ............. H01M 2/22 |
| JP | 2006-164713 A | | 6/2006 | |
| JP | 2007-095499 A | | 4/2007 | |
| JP | 2007-220601 A | | 8/2007 | |
| JP | 2010-108870 | * | 5/2010 | |
| JP | 2010-108870 A | | 5/2010 | |
| JP | 2010-108870 A | | 5/2010 | |

OTHER PUBLICATIONS

Search Report issued in Chinese Application No. 201180067462.X dated Feb. 28, 2015.

* cited by examiner

BATTERY AND MANUFACTURING METHOD OF THE BATTERY

RELATED APPLICATIONS

This application is the U.S. National Phase under 35 U.S.C. § 371 of International Application No. PCT/JP2011/007119, filed on Dec. 20, 2011, which in turn claims the benefit of Japanese Application No. 2011-030708, filed on Feb. 16, 2011, the disclosures of which Applications are incorporated by reference herein.

TECHNICAL FIELD

The present disclosure relates to batteries and methods of manufacturing the batteries.

BACKGROUND ART

Nonaqueous electrolyte secondary batteries have high energy density, and are thus widely used as power supplies of portable electronic devices such as mobile phones and laptop computers.

Out of nonaqueous electrolyte secondary batteries, lithium ion secondary batteries have a high voltage of 3.6 V, and may be 50% by mass and about 20-50% by volume of nickel-hydrogen batteries when compared at the same power generation energy. The lithium ion secondary batteries have high energy density and can be thus miniaturized. Furthermore, without memory effect, lithium ion secondary batteries account for a largest share of power supplies of mobile phones and laptop computers.

Small lithium ion secondary batteries are divided into those in a cylindrical shape and those in a flat shape. The smaller, the more easily the batteries are fabricated in the cylindrical shape. As shown in Patent Document 1, a cylindrical lithium ion secondary battery accommodates a wound electrode body inside a cylindrical battery can. The battery can is formed by fixing a sealing plate to an opening of a closed-end cylindrical body with an insulating member interposed therebetween by crimping. The wound electrode body is formed by interposing a separator between positive and negative band-like electrodes and winding them in whorls. The wound electrode body has a through-hole in a winding core center.

A positive electrode current collector plate is welded onto the end edge of the positive electrode of the wound electrode body. The top of the lead extending toward the positive electrode current collector plate is welded onto the back surface of the sealing plate. A positive electrode terminal projecting outside is formed in the sealing plate. On the other hand, a negative electrode current collector plate is welded onto the end edge of the negative electrode of the wound electrode body (i.e., the bottom of the battery can). The surface of the negative electrode current collector plate is welded onto the bottom of the closed-end cylindrical body. A plurality of projections extending to the bottom of the closed-end cylindrical body are formed concyclically on the surface of the negative electrode current collector plate in a portion corresponding to the through-hole of the wound electrode body.

In welding the negative electrode current collector plate onto the bottom of the closed-end cylindrical body, a columnar electrode rod is inserted into the through-hole of the wound electrode body so that the top of the electrode rod comes into contact with the back surface of the negative electrode current collector plate, and so that an electrode piece comes into contact with the back surface of the closed-end cylindrical body to face the electrode rod, with the negative electrode current collector plate accommodating the wound electrode body inside the closed-end cylindrical body. By flowing a current between the electrode rod and the electrode piece, the negative electrode current collector plate and the closed-end cylindrical body are resistance-welded. As a result, the negative electrode current collector plate and the closed-end cylindrical body are jointed and electrically coupled together at junctions between the tops of the projections of the negative electrode current collector plate and the bottom of the closed-end cylindrical body.

CITATION LIST

Patent Document

PATENT DOCUMENT 1: Japanese Patent Publication No. 2006-164713
PATENT DOCUMENT 2: Japanese Patent Publication No. 2007-95499

SUMMARY OF THE INVENTION

Technical Problem

In Patent Document 1, the columnar electrode rod is inserted into the through-hole of the wound electrode body and pressed onto the bottom of the cylindrical body to resistance-weld the negative electrode current collector plate and the closed-end cylindrical body. In this structure, if the columnar electrode rod is not pressed onto the bottom of the cylindrical body with high pressure, the electrical coupling between the negative electrode current collector plate and the closed-end cylindrical body is insufficient. Thus, the columnar electrode rod needs to have a great radius to some extent not to curve by the pressure.

However, where a battery itself is small and a columnar electrode rod has a great radius, there is a need to reduce the amount of the positive electrode and the negative electrode accordingly, thereby reducing the battery capacity. If the amount of the positive electrode and the negative electrode is to be increased, a fine columnar electrode rod is required, thereby reducing the pressure. This results in insufficient electrical coupling between the negative electrode current collector plate and the closed-end cylindrical body. As such, the electrical resistance increases at the coupling portion to reduce the extracted voltage and the battery capacity. In particular, a voltage drop increases due to the resistance inside the battery in extracting a large current.

Patent Document 2 shows a small cylindrical (pin-like) lithium ion battery having a different structure from Patent Document 1. The battery is formed by winding a positive electrode plate and a negative electrode plate around a negative electrode pin with a separator interposed between the positive and negative electrode plates. The head of the negative electrode pin is used as a negative electrode terminal In this structure, since there is no need to weld the bottom of a cylindrical battery case and the negative electrode pin, the problem of Patent Document 1 does not occur.

In the battery of Patent Document 2, however, it is difficult to sufficiently improve the sealing properties between the head of the negative electrode pin and the battery case due to its structure. In particular, where gas occurs inside the battery, leakage is difficult to prevent. With a decrease in the size of the battery, the problem of the sealing properties becomes difficult to solve.

The present disclosure was made in view of the problems. It is an objective of the present disclosure to provide a battery accommodating a wound electrode group in a closed-end cylindrical case, and having high sealing properties, great battery capacity, and reliable low-resistive coupling between a current collector lead and an electrode terminal.

Solution to the Problem

A battery according to the present disclosure includes a first electrode plate; a second electrode plate having polarity opposite to that of the first electrode plate; a separator interposed between the first and second electrode plates; a closed-end cylindrical metal case configured to accommodate the first electrode plate, the second electrode plate, and the separator; and a sealing member configured to seal an opening of the metal case with an insulating member interposed therebetween. The first and second electrode plates are wound with the separator interposed therebetween to form a wound electrode group. A center axis portion of the wound electrode group includes a center axis of a cylinder of the metal case, and contains no power-generating element. The metal case is a first electrode terminal, and the sealing member is a second electrode terminal A first current collector lead electrically coupled to the first electrode plate extends toward the opening of the metal case, and joined to an inner sidewall surface of the metal case. A second current collector lead electrically coupled to the second electrode plate extends toward the opening of the metal case, and joined to the sealing member.

Each "electrode plate" here denotes a flat plate containing an active material, and is a positive electrode or a negative electrode. The term "joined" denotes being firmly connected by bonding or welding.

A first manufacturing method of a battery according to the present disclosure includes a step of attaching a first current collector lead to a first electrode plate; a step of attaching a second current collector lead to a second electrode plate having polarity opposite to that of the first electrode plate; a step of fabricating a wound electrode group by winding the first electrode plate and the second electrode plate around a winding core member with a separator interposed between the first and second electrode plates; a step of accommodating the wound electrode group in a closed-end cylindrical metal case being a first electrode terminal; a step X of joining the first current collector lead to an inner sidewall surface of the metal case; a step of joining the second current collector lead to a sealing member being a second electrode terminal; and a step of sealing the metal case by disposing an insulating member at an inner-surface side of an opening of the metal case, inserting the sealing member in a position of the opening in which the insulating member is disposed, and crimping the metal case around the sealing member. Before the step X, a joint portion of the first current collector lead with the inner sidewall surface of the metal case is curved in a same direction as a curve of the inner sidewall surface of the metal case.

A second manufacturing method of a battery according to the present disclosure includes a step of attaching a first current collector lead to a first electrode plate; a step of attaching a second current collector lead to a second electrode plate having polarity opposite to that of the first electrode plate; a step of fabricating a wound electrode group by winding the first electrode plate and the second electrode plate around a winding core member with a separator interposed between the first and second electrode plates; a step of accommodating the wound electrode group in a closed-end cylindrical metal case being a first electrode terminal; a step X of joining the first current collector lead to an inner sidewall surface of the metal case; a step of joining the second current collector lead to a sealing member being a second electrode terminal; and a step of sealing the metal case by disposing an insulating member at an inner-surface side of an opening of the metal case, inserting the sealing member in a position of the opening in which the insulating member is disposed, and crimping the metal case around the sealing member. In the step X of joining, a joint portion of the first current collector lead with the inner sidewall surface of the metal case is curved in a same direction as a curve of the inner sidewall surface of the metal case.

Advantages of the Invention

In the battery according to the present disclosure, the first current collector lead is joined to the inner sidewall surface of the metal case, and the second current collector lead is joined to the sealing member which seals the opening of the metal case with the insulating member interposed therebetween. This increases the sealing properties, and provides reliable low-resistive coupling between the current collector lead the electrode terminal, thereby increasing the voltage and the capacity.

DESCRIPTION OF EMBODIMENTS

First Embodiment

Figure 1:
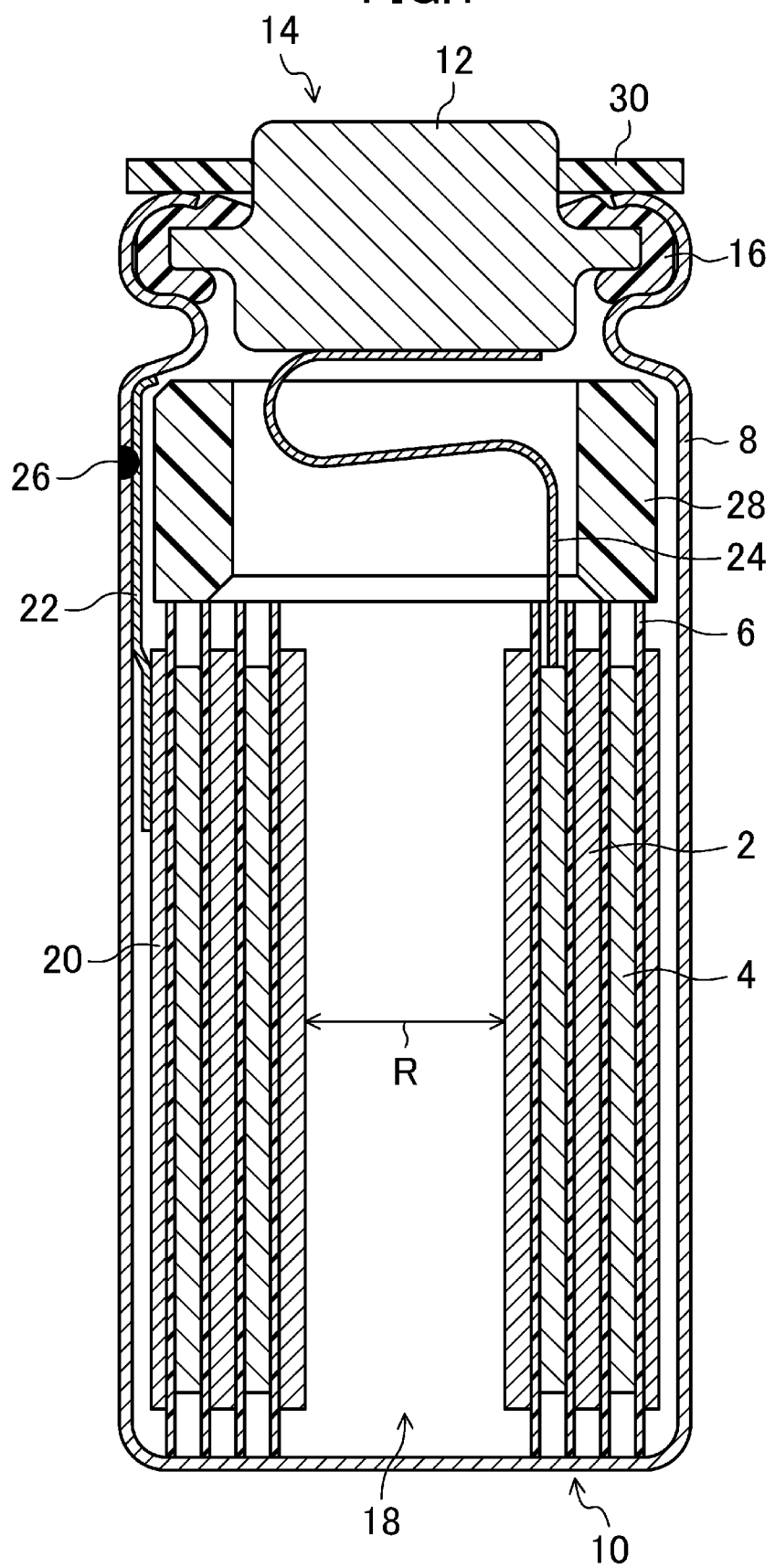
FIG. 1 is a schematic cross-sectional view of a battery according to an embodiment.

Embodiments of the present disclosure will be described hereinafter in detail with reference to the drawings. In the drawings, the same reference characters are used to represent equivalent elements having substantially the same functions for simplicity of explanation.

FIG. 1 illustrates the schematic cross-section of a battery according to a first embodiment. The battery according to this embodiment is in a substantially cylindrical shape. A closed-end cylindrical metal case 8 accommodates a negative electrode 2 being a first electrode plate and a positive electrode 4 being a second electrode plate, which are wound with a separator 6 interposed therebetween. That is, the negative electrode 2, the positive electrode 4, and the separator 6 are wound to form a wound electrode group. Although not shown, the metal case 8 also accommodates a nonaqueous electrolyte. The center axis of the cylindrical metal case 8 is located in a center axis portion 18 of the wound electrode group. That is, the center axis portion 18 of the wound electrode group includes the center axis of the metal case 8. The center axis portion 18 of the wound electrode group does not contain any active material which is a power-generating element. The "center axis portion 18 of the wound electrode group" denotes the region extending from the center axis of the wound electrode group to the innermost portion of the electrode group.

A negative electrode current collector lead 22, which is electrically coupled to the negative electrode 2, is joined (at a welding point 26) and electrically coupled to an inner sidewall surface of the metal case 8, which also serves as a negative electrode terminal 10. On the other hand, a positive electrode current collector lead 24, which is electrically coupled to the positive electrode 4, is joined and electrically coupled to a sealing member 12, which also serves as a positive electrode terminal 14. The sealing member 12 is a member which seals the opening of the metal case 8. An insulating member 16 is interposed between the sealing member 12 and the metal case 8, and the metal case 8 is crimped around the sealing member of the metal case 8 at the opening. A ring intermediate member 28, which is an insulating member, is disposed between the wound electrode group and the sealing member 12 to reliably insulate the negative-electrode side from the positive-electrode side. The portion of the sealing member 12, which projects outside the battery, is set in a hole of a perforated circular plate 30 made of an insulating material, thereby securing the insulation from the metal case 8.

Figure 2:
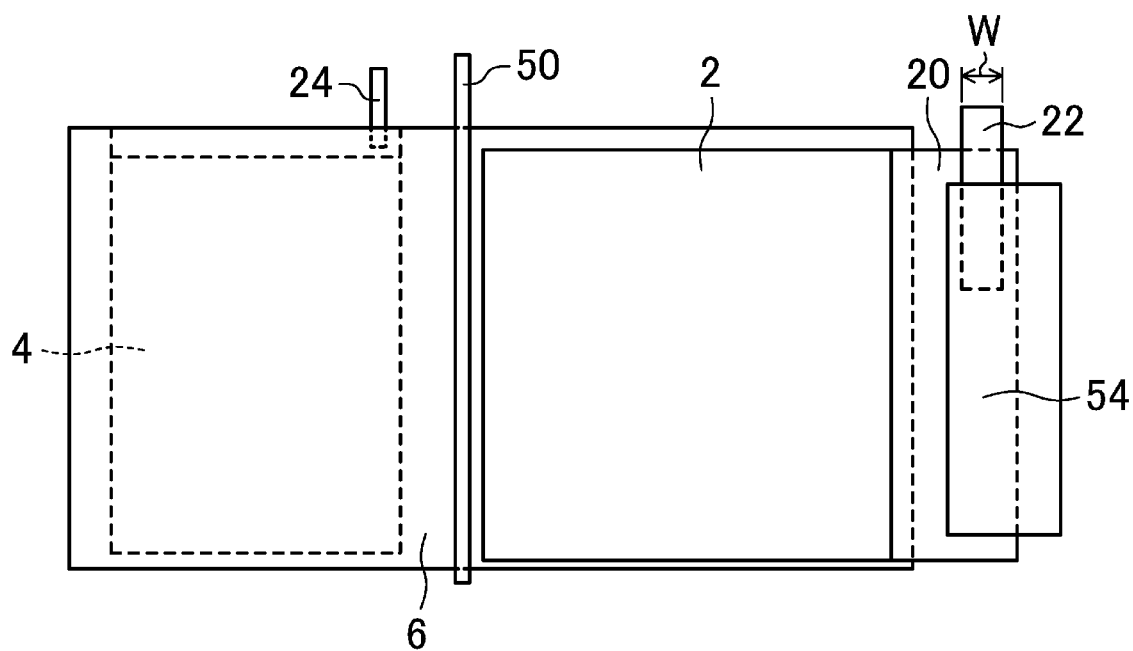
FIG. 2 illustrates an unwound electrode group.

As shown in FIG. 2, the negative electrode 2 is formed by mounting a negative electrode active material on a negative electrode core material 20, which is metal foil. The negative electrode current collector lead (i.e., a first current collector lead) 22 is joined to the negative electrode core material 20. Similarly, the positive electrode 4 is formed by mounting a positive electrode active material on a positive electrode core material (not shown). The positive electrode current collector lead (i.e., a second current collector lead) 24 is joined to the positive electrode core material. The separator 6 is interposed between the negative electrode 2 and the positive electrode 4, and then wound around a winding core 50 to form the wound electrode group. After the winding, the winding end is fixed with a fixing tape 54 not to move, and the winding core 50 is extracted and put into the metal case 8. At this time, the winding core 50 is put so that both of the negative electrode current collector lead 22 and the positive electrode current collector lead 24 are located at the opening side of the metal case 8.

The active materials for the negative electrode 2 and the positive electrode 4 are compressed and mounted on the core materials to increase the battery capacity. If R at the winding start is too small, the active materials may be removed by the core materials to cause a short-circuit inside the battery. Therefore, the winding core 50 needs to have great R to some extent. On the other hand, if R of the winding core 50 is too great, the amount of the active materials accommodated inside the battery decreases, thereby reducing the battery capacity. In view of the two problems, R of the winding core 50 is preferably 3.0 mm or less, and more preferably less than 1.5 mm Therefore, the center axis portion of the wound electrode group is preferably a space with a diameter of 3.0 mm or less without any active material, and more preferably a space with a diameter of less than 1.5 mm without any active material.

After the wound electrode group is put into the metal case 8, the negative electrode current collector lead 22 located in the outer periphery of the wound electrode group comes into contact with the inner sidewall surface of the metal case 8. Then, the negative electrode current collector lead 22 and the metal case 8 are joined by spot welding. At this time, assume that the negative electrode current collector lead 22 does not curve in the same direction as the inner sidewall surface of the metal case 8. The portions of the negative electrode current collector lead 22 and the metal case 8, which form the welding point 26, are not sufficiently in contact with each other, even if two electrodes to be welded sandwich the negative electrode current collector lead 22 and the metal case 8 in the spot welding. That is, sufficient welding is impossible. As a result, the resistance of the welding portion increases, or in the worst case, the welding portion is removed and no current is extracted.

Assume that the battery case is in a cylindrical shape, and the negative electrode current collector lead is joined to the sidewall of the battery case. The inner sidewall surface of the battery case curves inside in a recess shape. The negative electrode current collector lead is planar metal foil. Thus, the negative electrode current collector lead does not curve along the curve of the inner sidewall surface of the battery case. The both ends of the negative electrode current collector lead are merely in contact with the sidewall of the battery case. The center of the negative electrode current collector lead, which is the portion to be joined, is apart from the sidewall of the battery case. Thus, the joint portion is insufficient if the center is joined by spot welding etc. In the worst case, the center is not joined. This problem does not occur in a flat battery case.

Figure 3:
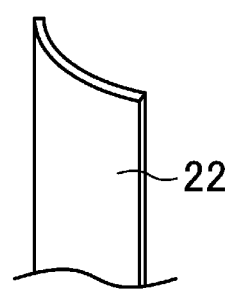
FIG. 3 illustrates a negative electrode current collector lead.

In order to curve the negative electrode current collector lead 22 in the same direction as the curve of the inner sidewall surface of the metal case 8, the negative electrode current collector lead 22 may be curved before the welding. Alternatively, the negative electrode current collector lead 22 may be made of a material, which easily curves by pressure of an electrode to be welded. For example, the negative electrode current collector lead 22 may be made of Ni foil with a thickness of 50 μm, and may be, as shown in FIG. 3, curved before winding the negative electrode 2, the positive electrode 4, and the separator 6. The negative electrode current collector lead 22 may curve at at least the welding portion. The negative electrode current collector lead 22 is preferably made of metal foil with a thickness ranging from 20 μm to 80 μm, both inclusive.

In order to curve the negative electrode current collector lead 22 in the same direction as the curve of the inner sidewall surface of the metal case 8, and to perform strong welding, the center of the radius of curvature of the negative electrode current collector lead 22 is located inside the metal case 8, with the negative electrode current collector lead 22 being in contact with the inner surface of the metal case 8.

In this embodiment, the spot welding is performed at the opening of the metal case 8, the welding portion is visually confirmed to know whether or not the welding is reliably preformed.

In FIG. 2, the length W of the negative electrode current collector lead 22 in the circumferential direction of the wound electrode group preferably ranges from 10% to 30%, both inclusive, of the length of the outer periphery of the wound electrode group. This is because welding is reliably performed and the battery capacity is sufficiently secured within the range. Specifically, if the length W is too small, the welding is not reliably performed. With an increase in the length W, the loss of the active material by the formation of the negative electrode current collector lead 22 increases.

In the battery shown in Patent Document 2, electrical conduction is made by pressing the current collector lead against the exterior. If an oxide film is formed on the surface of the current collector lead, the contact resistance increases. It is important to control the position so that the extending top of the current collector lead is located around the portion with a reduced diameter near the sealing portion. If the position is not correctly controlled, the current collector lead is caught in the sealing portion. Then, a space is formed in the sealing portion, thereby degrading the sealing properties. In the battery according to this embodiment, since the current collector lead is welded in a position apart from the sealing portion, the problem in the battery of Patent Document 2 does not occur.

The positive electrode 4, the negative electrode 2, the separator 6, and the nonaqueous electrolyte forming the battery according to this embodiment will be described below in detail.

First, the positive electrode will be described in detail.
Positive Electrode

The positive electrode core material (i.e., a positive electrode current corrector) and a positive electrode mixture layer, which form the positive electrode 4, will be described sequentially.

The positive electrode current corrector is a long conductor substrate with a porous structure or a non-porous structure. The positive electrode current corrector is mainly made of metal foil of aluminum. The thickness of the positive electrode current corrector is not particularly limited, but preferably ranges from 1 µm to 500 µm, both inclusive, and more preferably ranges from 10 µm to 20 µm, both inclusive. As such, the thickness of the positive electrode current corrector falls within the above-described range, thereby maintaining the strength of the positive electrode 4 and reducing the weight of the positive electrode 4.

The positive electrode active material, a binder, and a conductive agent, which are contained in the positive electrode mixture layer, will be described sequentially.
Positive Electrode Active Material The positive electrode active material is preferably lithium-containing composite oxide, for example, $LiCoO_2$, $LiNiO_2$, $LiMnO_2$, $LiCo_xNi_{1-x}O_2$, $LiCo_xM_{1-x}O_2$, $LiNi_xM_{1-x}O_2$, $LiNi_{1/3}Co_{1/3}Mn_{1/3}O_2$, $LiMn_2O_4$, $LiMnMO_4$, $LiMePO_4$, $Li_2MePO_4F$, where M is at least one of Na, Mg, Sc, Y, Mn, Fe, Co, Ni, Cu, Zn, Al, Cr, Pb, Sb, or B, x is expressed by $0<x<1$, and Me is a metal element containing at least one element selected from the group consisting of Fe, Mn, Co, or Ni. Alternatively, part of the elements of the lithium-containing compound may be replaced with another type of element. The positive electrode active material may be a positive electrode active material being subjected to surface treatment with metal oxide, lithium oxide, a conductive agent, etc. The surface treatment may be, for example, hydrophobization.

The positive electrode active material preferably has an average particle diameter ranging from 5 µm to 20 µm, both inclusive. If the average particle diameter of the positive electrode active material is less than 5 µm, the surface areas of the active material particles extremely increase, thereby extremely increasing the amount of the binder satisfying the bonding strength for sufficiently handling a positive electrode plate. This reduces the amount of the active material per electrode plate, thereby reducing the battery capacity. On the other hand, if the average particle diameter is more than 20 µm, a coating streak tends to occur in coating the positive electrode current corrector with positive electrode mixture slurry.
Binder The binder is made of, for example, PVDF, polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, carboxymethyl cellulose, etc. Alternatively, the binder may be made of a copolymer formed by copolymerizing two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethylvinylether, acrylic acid, or hexadiene, or a mixture formed by mixing the selected two or more materials.

Out of the above-listed binders, PVDF and PVDF derivative are particularly chemically stable in the nonaqueous electrolyte secondary battery, sufficiently binds the positive electrode mixture layer and the positive electrode current corrector, and the positive electrode active material forming the positive electrode mixture layer, the binder, and the conductive agent. This provides excellent charge-discharge cycle characteristics and discharge performance. Therefore, PVDF and PVDF derivative are preferably used as the binder of this embodiment. In addition, PVDF and PVDF derivative are available at low costs and thus preferable. In order to fabricate the positive electrode using PVDF as a binder, for example, PVDF is dissolved in N methyl pyrrolidone, or PVDF powder is dissolved in the positive electrode mixture slurry when fabricating the positive electrode.
Conductive Agent The conductive agent is, for example, graphites such as natural graphite or artificial graphite; carbon blacks such as acetylene black (AB), ketjen black, channel black, furnace black, lamp black, or thermal black; conductive fibers such as carbon fiber or metal fiber;

fluorocarbon, powders of metal such as aluminum, conductive whiskers such as zinc oxide or potassium titanate, conductive metal oxide such as titanium oxide, organic conductive materials such as phenylene derivative, etc.

Next, the negative electrode will be described in detail.
Negative Electrode

The negative electrode core material (i.e., a negative electrode current corrector) and a negative electrode mixture layer, which form the negative electrode 2, will be described sequentially.

The negative electrode current corrector is a long conductor substrate with a porous structure or a non-porous structure. The negative electrode current corrector is made of, for example, stainless steel, nickel, copper, etc. The thickness of the negative electrode current corrector is not particularly limited, but preferably ranges from 1 µm to 500 µm, both inclusive, and more preferably ranges from 5 µm to 20 µm, both inclusive. As such, the thickness of the negative electrode current corrector falls within the above-described range, thereby maintaining the strength of the negative electrode 2 and reducing the weight of the negative electrode 2.

The negative electrode mixture layer preferably contains a binder in addition to the negative electrode active material.

The negative electrode current collector lead 22 is preferably made of nickel, iron, stainless steel, copper, etc. The thickness preferably ranges from 10 µm to 120 µm, both inclusive, and more preferably ranges from 20 µm to 80 µm. The shape is not particularly limited, and may be a strip having a tab for welding with the negative electrode core material, and a tab for welding with an exterior case, an oval being in internal contact with the strip, a polygon, etc. The negative electrode current collector lead 22 is characterized by curving by small pressure.

The negative electrode active material contained in the negative electrode mixture layer will be described below.

Negative Electrode Active Material

The negative electrode active material is a material capable of inserting and extracting lithium ions, and may be, for example, metal, metal fiber, a carbon material, oxide, nitride, a silicon compound, a tin compound, various types of alloy material, etc. Out of them, the carbon material is, for example, various types of natural graphite, coke, partially graphitized carbon, carbon fiber, spherical carbon, various types of artificial graphite, amorphous carbon, etc.

A single element such as silicon (Si) or tin (Sn), a silicon compound, or a tin compound have a high capacitance density. Therefore, the negative electrode active material is, for example, preferably silicon, tin, a silicon compound, and a tin compound. Out of them, the silicon compound is specifically, for example, SiOx, where $0.05<x<1.95$, or silicon alloy, silicon solid solution, etc., in which part of Si is replaced with at least one element selected from the group consisting of B, Mg, Ni, Ti, Mo, Co, Ca, Cr, Cu, Fe, Mn, Nb, Ta, V, W, Zn, C, N, or Sn. The tin compound is specifically, for example, $Ni_2Sn_4$, $Mg_2Sn$, $SnO_x$, where $0<x<2$, $SnO_2$, $SnSiO_3$, etc. The negative electrode active material may be one of the above examples, or may be a combination of two or more of the examples.

Furthermore, a negative electrode is provided, which is formed by depositing the silicon, the tin, the silicon compound, or the tin compound as a thin film on the negative electrode current corrector.

Next, the separator will be described.

Separator (Porous Insulator)

The separator 6 interposed between the positive electrode 4 and the negative electrode 2 is, for example, made of a microporous thin film, woven fabric, non-woven fabric, etc., which have great ion transmittance, predetermined mechanical strength, and insulating properties. In particular, the separator 6 is preferably, for example, polyolefin such as polypropylene and polyethylene. Polyolefin has excellent durability and a shutdown function, thereby improving the safety of the lithium ion secondary battery.

The thickness of the separator 6 generally ranges from 10 µm to 300 µm, both inclusive, but preferably ranges from 10 µm to 40 µm, both inclusive. More preferably, the thickness of the separator 6 ranges from 15 µm to 30 µm, both inclusive, and furthermore preferably ranges from 10 µm to 25 µm, both inclusive. Where the separator 6 is a microporous thin film, the microporous thin film may be a single-layer film made of a single material, or a composite film or a multilayer film made of a single material, or two or more materials. The porosity of the separator 6 preferably ranges from 30% to 70%, both inclusive, and more preferably ranges from 35% to 60%, both inclusive. The "porosity" here denotes the ratio of the volume of the pores to the entire volume of the separator.

Then, the nonaqueous electrolyte will be described in detail.

Nonaqueous Electrolyte

The nonaqueous electrolyte is, for example, a liquid, gel, or solid nonaqueous electrolyte.

The liquid nonaqueous electrolyte (nonaqueous electrolyte fluid) contains an electrolyte (e.g., lithium salts) and a nonaqueous solvent dissolving the electrolyte.

The gel nonaqueous electrolyte contains a nonaqueous electrolyte, and a polymer material holding the nonaqueous electrolyte. The polymer material is, for example, polyvinylidene fluoride, polyacrylonitrile, polyethylene oxide, polyvinyl chloride, polyacrylate, polyvinylidene fluoride hexafluoropropylene, etc.

The solid nonaqueous electrolyte contains a solid polymer electrolyte.

The nonaqueous electrolyte fluid will be described below in detail.

The nonaqueous solvent dissolving the electrolyte may be a known nonaqueous solvent. The type of the nonaqueous solvent is not particularly limited, but may be, for example, cyclic carbonic ester, chain carbonic ester, cyclic carboxylate ester, etc. The cyclic carbonic ester is specifically, for example, propylene carbonate (PC), ethylene carbonate (EC), etc. The chain carbonic ester is specifically, for example, diethyl carbonate (DEC), ethylmethyl carbonate (EMC), dimethyl carbonate (DMC), etc. The cyclic carboxylate ester is specifically, for example, gamma-butyrolactone (GBL), gamma-valerolactone (GVL), etc. The nonaqueous solvent may be one of the above examples, or may be a combination of two or more of the examples.

The electrolyte dissolved in the nonaqueous solvent is, for example, $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lower aliphatic lithium carboxylate, LiCl, LiBr, LiI, chloroborane lithium, borates, imidates, etc. The borates are specifically, for example, lithium bis(1,2-benzendiolate(2-)-O,O')borate, lithium bis(2,3-naphthalenediolate(2-)-O,O')borate, lithium bis(2,2'-biphenyldiolate(2-)-O,O')borate, lithium bis(5-fluoro-2-olate-1-benzenesulfonic acid-O,O')borate, etc. The imidates are specifically, for example, lithium bis(trifluoromethanesulfonyl)imide (($CF_3SO_2)_2NLi$), lithium trifluoromethanesulfonate nonafluorobutanesulfonimide (LiN$(CF_3SO_2)(C_4F_9SO_2)$), lithium bispentafluoroethanesulfonimide (($C_2F_5SO_2)_2NLi$), etc. The electrolyte may be one of the above examples, or may be a combination of two or more of the examples.

The amount of dissolution of the electrolyte to the nonaqueous solvent preferably ranges from 0.5 mol/m$^3$ to 2 mol/m$^3$, both inclusive.

In addition to the electrolyte and the nonaqueous solvent, the nonaqueous electrolyte fluid may contain, for example, an additive which decomposes on the negative electrode and forms a film with high lithium ion conductivity to increase the charge-discharge efficiency of the battery. The addictive with this function is made of, for example, vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), divinylethylene carbonate, etc. The addictive may be only one of the above examples, or may be a combination of two or more of the examples. In particular, the addictive is preferably at least one selected from the group consisting of vinylene carbonate, vinylethylene carbonate, or divinylethylene carbonate of the above examples. The addictive may be made of the above examples, in which part of hydrogen atoms is replaced with fluorine atoms.

In addition to the electrolyte and the nonaqueous solvent, the nonaqueous electrolyte fluid may further contain a known benzene derivative which decomposes at an overcharge and forms a film on the electrode to inactivate the battery. The benzene derivative with this function preferably has a phenyl group or a cyclic compound group adjacent to the phenyl group. The benzene derivative is specifically, for example, cyclohexylbenzene, biphenyl, diphenyl ether, etc. The cyclic compound group contained in the benzene derivative is specifically, for example, a phenyl group, a cyclic ether group, a cyclic ester group, a cycloalkyl group, a phenoxy group, etc. The benzene derivative may be only one of the above examples, or may be a combination of two or more of the examples. The amount of the benzene derivative contained in the nonaqueous solvent is preferably 10 Vol % or less of the entire nonaqueous solvent.

Next, a manufacturing method of the battery according to the first embodiment will be described using a lithium ion secondary battery as a specific example.

A fabrication method of the positive electrode 4, a fabrication method of the negative electrode 2, and a manufacturing method of the battery will be described sequentially.

Fabrication Method of Positive Electrode

The fabrication method of the positive electrode 4 is as follows. First, the positive electrode active material, the binder, which is preferably made of, for example, the PVDF, the PVDF derivative, or a rubber binder as described above, and the conductive agent are mixed into a liquid component to prepare the positive electrode mixture slurry. Next, the obtained positive electrode mixture slurry is applied to the surface of the positive electrode current corrector made of aluminum foil and dried. Then, the positive electrode current corrector with the positive electrode mixture slurry applied and dried on the surface is rolled (i.e., compressed) to fabricate the positive electrode (i.e., the positive electrode plate) with a predetermined thickness.

The amount of the binder contained in the positive electrode mixture slurry preferably ranges from 3.0 vol % to 6.0 vol %, both inclusive, of the positive electrode active material of 100 vol %. In other words, the amount of the binder contained in the positive electrode mixture layer preferably ranges from 3.0 vol % to 6.0 vol %, both inclusive, of the positive electrode active material of 100 vol %.

Fabrication Method of Negative Electrode

The fabrication method of the negative electrode 2 is as follows. First, the negative electrode active material and the binder are mixed into the liquid component to prepare the negative electrode mixture slurry. The obtained negative electrode mixture slurry is applied to the surface of the negative electrode current corrector and dried. Then, the negative electrode current corrector with the negative electrode mixture slurry applied and dried on the surface is rolled to fabricate the negative electrode with a predetermined thickness.

Manufacturing Method of Battery

The manufacturing method of the battery is as follows. First, the positive electrode current collector lead 24 made of aluminum is attached to the positive electrode current corrector. The negative electrode current collector lead 22 made of nickel is attached to the negative electrode current corrector. After that, the positive electrode 4 and the negative electrode 2 are wound around the winding core 50 with the separator 6 interposed between the positive and negative electrodes to form the wound electrode group. Next, the wound electrode group, from which the winding core 50 has been extracted, is accommodated in the metal case 8. At this time, the wound electrode group is accommodated so that the negative electrode current collector lead 22 and the positive electrode current collector lead 24 are located at the opening side of the metal case 8. Then, the negative electrode current collector lead 22 is welded onto the metal case 8, and the intermediate member 28 is located on the wound electrode group. The positive electrode current collector lead 24 is welded onto the sealing member 12. After that, the nonaqueous electrolyte fluid is applied into the metal case 8 by depressurization. Finally, the ends of the metal case 8 at the opening are crimped around the sealing member 12 with the insulating member 16 interposed therebetween to set the perforated circular plate 30 in the sealing member 12. As a result, the battery is manufactured.

First Variation

Figure 4:
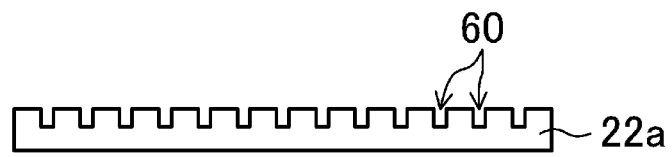
FIG. 4 illustrates an example structure of the negative electrode current collector lead.

FIG. 4 illustrates a negative electrode current collector lead 22a according to a first variation. This variation differs from the above-described embodiment only in the negative electrode current collector lead 22a. The other members, the structures, and the manufacturing method are the same as those in the above-described embodiment.

FIG. 4 illustrates the top surface of the negative electrode current collector lead 22a as viewed from the opening of the metal case 8. In the negative electrode current collector lead 22a, a plurality of grooves 60 extending along the center axis of the wound electrode group are formed. That is, these grooves 60 extend in the direction orthogonal to the circumferential direction of the wound electrode group. The grooves 60 may be formed in the negative electrode current collector lead 22a on the surface facing the center axis portion 18 of the wound electrode group or on the opposite surface.

In this variation, the grooves 60 are formed in the negative electrode current collector lead 22a. Thus, the negative electrode current collector lead 22a reliably curves in spot welding along the curve of the inner sidewall surface of the metal case 8 even with the low pressure of the welded electrode applied onto the negative electrode current collector lead 22a. Therefore, without extra work for curving the negative electrode current collector lead 22a in advance, the negative electrode current collector lead 22a curves along the inner sidewall surface of the metal case 8 in the step of the spot welding. As a result, the negative electrode current collector lead 22a is reliably welded onto the metal case 8.

Second Variation

Figure 5:
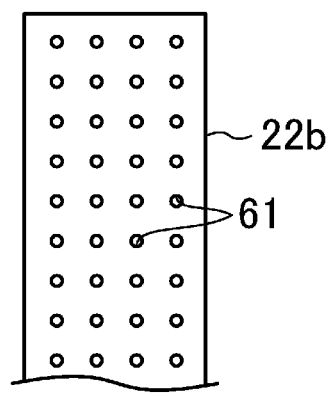
FIG. 5 illustrates another example structure of the negative electrode current collector lead.

FIG. 5 illustrates a negative electrode current collector lead 22b according to a second variation. This variation differs from the above-described embodiment only in the negative electrode current collector lead 22b. The other members, the structures, and the manufacturing method are the same as those in the above-described embodiment.

A plurality of through-holes 61 are open in a grid pattern in the negative electrode current collector lead 22b. In this variation, the plurality of through-holes 61 allow the negative electrode current collector lead 22b to reliably curve in spot welding along the curve of the inner sidewall surface of the metal case 8 even with the low pressure of the welded electrode applied to the negative electrode current collector lead 22b. Therefore, without extra work for curving the negative electrode current collector lead 22b in advance, the negative electrode current collector lead 22b curves along the inner sidewall surface of the metal case 8 in the step of the spot welding. As a result, the negative electrode current collector lead 22b is reliably welded onto the metal case 8.

Third Variation

Figure 6:
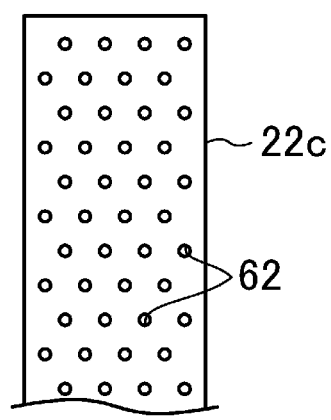
FIG. 6 illustrates still another example structure of the negative electrode current collector lead.

FIG. 6 illustrates a negative electrode current collector lead 22c according to a third variation. This variation differs from the above-described embodiment only in the negative electrode current collector lead 22c. The other members, the structures, and the manufacturing method are the same as those in the above-described embodiment.

A plurality of through-holes 62 are open in a honeycomb pattern in the negative electrode current collector lead 22c. In this variation, the plurality of through-holes 62 allow the negative electrode current collector lead 22c to reliably curve in spot welding along the curve of the inner sidewall surface of the metal case 8 even with the low pressure of the welded electrode onto the negative electrode current collector lead 22c. Therefore, without extra work for curving the negative electrode current collector lead 22c in advance, the negative electrode current collector lead 22c curves along the inner sidewall surface of the metal case 8 in the step of the spot welding. As a result, the negative electrode current collector lead 22c is reliably welded onto the metal case 8. In addition, since the plurality of through-holes 62 are arranged in the honeycomb pattern, the negative electrode current collector lead 22c maintains great mechanical strength as compared to the second variation.

As described above, in each of the batteries of the embodiment and the variations, the negative electrode current collector lead 22, 22a, 22b, or 22c is reliably jointed to the metal case 8, thereby providing excellent impedance characteristics and excellent high-load characteristics when a large current flows.

Other Embodiments

The above-described embodiments are mere examples of the present disclosure, and the present disclosure is not limited thereto. The type of battery is not limited to the lithium ion battery. While the battery may be in any size, it is advantageous if the outer diameter of the battery is 10 mm or less, and more advantageous if the outer diameter is 6 mm or less. The winding core may not be extracted and may be left in the battery. The sealing member, the insulating member, etc. may be formed by combining two or more members.

INDUSTRIAL APPLICABILITY

As described above, the battery according to the present disclosure has excellent high-load characteristics, and is useful as a power supply etc. requiring a large current.

DESCRIPTION OF REFERENCE CHARACTERS

2 Negative Electrode
4 Positive Electrode
6 Separator
8 Metal Case
10 Negative Electrode Terminal
12 Sealing Member
14 Positive Electrode Terminal
16 Insulating Member
18 Center Axis Portion of Wound Electrode Group
20 Negative Electrode Core Material
22 Negative Electrode Current Collector Lead
22a Negative Electrode Current Collector Lead
22b Negative Electrode Current Collector Lead
22c Negative Electrode Current Collector Lead
24 Positive Electrode Current Collector Lead
26 Welding Point
50 Winding Core

The invention claimed is:
1. A battery, comprising:
a first electrode plate;
a second electrode plate having polarity opposite to that of the first electrode plate;
a separator interposed between the first and second electrode plates;
a closed-end cylindrical metal case configured to accommodate the first electrode plate, the second electrode plate, and the separator; and
a sealing member configured to seal an opening of the metal case with an insulating member interposed therebetween, wherein
the first and second electrode plates are wound with the separator interposed therebetween to form a wound electrode group,
the first electrode plate includes a first electrode core material, a first electrode active material which is disposed on the first electrode core material,
a center axis portion of the wound electrode group includes a center axis of a cylinder of the metal case, and contains no power-generating element,
the metal case is a first electrode terminal, and the sealing member is a second electrode terminal,
a first current collector lead electrically coupled to the first electrode core material extends toward the opening of the metal case, and joined to an inner sidewall surface of the metal case,
a second current collector lead electrically coupled to the second electrode plate extends toward the opening of the metal case, and joined to the sealing member,
the first current collector lead is joined to the inner sidewall surface of the metal case at a welding point which is located at a position closer to the opening of the metal case than an uppermost portion of the wound electrode group when viewed along a longitudinal axis of the metal case, and
a length of the first current collector lead in a circumferential direction of the wound electrode group ranges from 10% to 30%, both inclusive, of a length of an outer periphery of the wound electrode group.

2. The battery of claim 1, wherein the first current collector lead is made of metal foil with a thickness of 50 μm or less.

3. The battery of claim 1, wherein in the center axis portion of the wound electrode group, a portion without any power-generating element has a diameter of 3.0 mm or less.

4. The battery of claim 3, wherein the portion without any power-generating element has a diameter less than 1.5 mm.

5. The battery of claim 3, wherein the center axis portion of the wound electrode group is hollow.

6. The battery of claim 1, wherein
the first current collector lead curves in a same direction as the inner sidewall surface of the metal case, and
the first current collector lead is joined to the inner sidewall surface of the metal case such that a center of a radius of curvature of the first current collector lead is located inside the metal case.

7. The battery of claim 2, wherein a groove extending in a direction orthogonal to the circumferential direction of the wound electrode group is formed in the first current collector lead.

8. The battery of claim 2, wherein a plurality of holes are open in the metal foil forming the first current collector lead.

9. The battery of claim 8, wherein the holes are arranged in a honeycomb pattern.

10. The battery of claim 1, wherein the first current collector lead is joined to the first electrode core material at a point on a surface of the first electrode core material, and the first electrode active material is mounted on the surface of the first electrode core material.

11. The battery of claim 1, wherein a cross-section of the cylindrical metal case taken along a plane on which the cross-section has a circular shape includes the first current collector lead and the second current collector lead.

12. The battery of claim 1, further comprising:
an insulating member disposed between the wound electrode group and the sealing member,
wherein the first current collector lead is adjacent to the insulating member, and the second current collector lead is adjacent to the insulating member.

13. The battery of claim 12, wherein the insulating member has a ring shape,
the first current collector lead is located between the insulating member and the metal case, and
the second current collector lead is located inside the insulating member.

14. The battery of claim 12, wherein the welding point is adjacent to the insulating member.

* * * * *